United States Patent
Grothe et al.

(10) Patent No.: US 12,074,495 B2
(45) Date of Patent: Aug. 27, 2024

(54) PUMP DEVICE

(71) Applicant: HELLA GmbH & Co. KGaA, Lippstadt (DE)

(72) Inventors: Benjamin Grothe, Wickede (DE); Dominik Niess, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 277 days.

(21) Appl. No.: 17/673,340

(22) Filed: Feb. 16, 2022

(65) Prior Publication Data

US 2022/0173631 A1    Jun. 2, 2022

Related U.S. Application Data

(63) Continuation of application No. PCT/EP2020/072013, filed on Aug. 5, 2020.

(30) Foreign Application Priority Data

Aug. 16, 2019 (DE) .................... 10 2019 122 043.2

(51) Int. Cl.
| | |
|---|---|
| *H02K 3/52* | (2006.01) |
| *F04D 13/06* | (2006.01) |
| *F04D 29/02* | (2006.01) |
| *F04D 29/40* | (2006.01) |
| *F04D 29/42* | (2006.01) |
| *H02K 5/02* | (2006.01) |

(Continued)

(52) U.S. Cl.
CPC .............. *H02K 5/02* (2013.01); *H02K 3/522* (2013.01); *H02K 5/10* (2013.01); *F04D 13/0626* (2013.01); *F04D 29/02* (2013.01); *F04D 29/406* (2013.01); *F04D 29/4206* (2013.01); *H02K 5/08* (2013.01); *H02K 5/132* (2013.01)

(58) Field of Classification Search
CPC .. F04D 13/06; F04D 13/0606; F04D 13/0626; F04D 29/02; F04D 29/026; F04D 29/40; F04D 29/406; F04D 29/4206; H02K 5/02; H02K 5/10; H02K 5/08; H02K 5/12
See application file for complete search history.

(56) References Cited

U.S. PATENT DOCUMENTS

| | | | |
|---|---|---|---|
| 2,993,449 | A | 7/1961 | Harland |
| 3,638,055 | A | 1/1972 | Zimmermann |

(Continued)

FOREIGN PATENT DOCUMENTS

| | | |
|---|---|---|
| CN | 208749589 U | 4/2019 |
| DE | 1935929 A1 | 1/1971 |

(Continued)

OTHER PUBLICATIONS

International Search Report dated Oct. 30, 2020 in corresponding application PCT/EP2020/072013.

*Primary Examiner* — Charles G Freay
*Assistant Examiner* — David N Brandt
(74) *Attorney, Agent, or Firm* — Muncy, Geissler, Olds & Lowe, P.C.

(57) ABSTRACT

A pump device, in particular for a fluid circuit in a motor vehicle, comprising a stator, which has a stator core and a main body, and a rotor, wherein the rotor can be set in rotation relative to the stator, wherein the stator core is enclosed by the main body in a fluid-tight manner, and wherein the main body comprises a thermoset and a thermoplastic.

7 Claims, 2 Drawing Sheets

(51) Int. Cl.
*H02K 5/08* (2006.01)
*H02K 5/10* (2006.01)
*H02K 5/132* (2006.01)

(56) References Cited

U.S. PATENT DOCUMENTS

| | | | |
|---|---|---|---|
| 4,083,917 A * | 4/1978 | Hallerback | H02K 15/12 |
| | | | 264/263 |
| 6,663,362 B1 * | 12/2003 | Lentz | H02K 1/145 |
| | | | 310/43 |
| 8,342,800 B2 | 1/2013 | Cvjeticanin | |
| 9,318,931 B2 * | 4/2016 | Kim | F04D 13/06 |
| 9,702,366 B2 | 7/2017 | Aso et al. | |
| 11,156,222 B2 | 10/2021 | Diekmann et al. | |
| 2009/0053051 A1 * | 2/2009 | Cvjeticanin | F04D 29/4206 |
| | | | 415/203 |
| 2013/0028765 A1 | 1/2013 | Yokozawa et al. | |
| 2015/0340929 A1 * | 11/2015 | Aso | F04D 29/5806 |
| | | | 29/598 |

FOREIGN PATENT DOCUMENTS

| | | |
|---|---|---|
| DE | 19956380 C1 | 1/2001 |
| DE | 102007009781 A1 | 8/2008 |
| DE | 102017214997 A1 | 2/2019 |
| EP | 2781758 A1 | 9/2014 |

\* cited by examiner

PUMP DEVICE

This nonprovisional application is a continuation of International Application No. PCT/EP2020/072013, which was filed on Aug. 5, 2020, and which claims priority to German Patent Application No. 10 2019 122 043.2, which was filed in Germany on Aug. 16, 2019, and which are both herein incorporated by reference.

BACKGROUND OF THE INVENTION

Field of the Invention

The present invention relates to a pump device that can be suitable in particular for a fluid circuit in a motor vehicle.

Description of the Background Art

Pump devices having a stator and a rotor are known from the prior art. The rotor in this case is driven electromagnetically. For this purpose, the stator has a stator core with windings of an electromagnetic coil. Said stator core must be shielded from the fluid pumped by the pump device in order to prevent damage. For this purpose, in the prior art, the stator core is overmolded with a main body. The main body here consists of a thermoset with a coefficient of thermal expansion comparable to that of the stator core, so that if the stator core and the main body heat up during operation of the pump device, no cracks form in the main body that could cause leakage.

SUMMARY OF THE INVENTION

It is therefore an object of the present invention to provide a pump device that is easier to produce and a motor vehicle with such a pump device.

A pump device within the meaning of this description can also be referred to as a pump or pump unit.

The pump device can be designed in particular for a fluid circuit in a motor vehicle. It comprises a stator, which has a stator core and a main body. The stator core can comprise, for example, a plurality of laminations. The stator core can additionally comprise windings of an electromagnetic coil. It is possible that the stator core is overmolded by the main body. The windings can be arranged in one or more slots of the stator core. The pump device additionally comprises a rotor which can be set in rotation relative to the stator. This can be done, for example, by means of electromagnetic forces. The stator core can be enclosed by the main body in a fluid-tight manner. In the context of this description, this means in particular that the stator core is shielded from the fluid pumped by the pump device.

The main body comprises a thermoset and a thermoplastic. Because of this multi-component main body, the main body can have a coefficient of thermal expansion that is comparable to that of the stator core. At the same time, the region of the main body with the thermoplastic can be used to connect the main body to other components of the pump device. For example, the thermoplastic can be welded, screwed and/or latched to other components more easily than the thermoset. Thus, the manufacture of the pump device is simplified.

An inner region of the main body can comprise the thermoset and an outer region of the main body can comprise the thermoplastic. The inner region is understood here to be a region facing the rotor. The outer region is understood here to be a region that represents an outer side of the main body and is directed away from the rotor. This is advantageous because other components of the pump device are often connected to the outer side of the main body.

The thermoset can form a base region of the main body. In the context of this description, a base region is understood to mean, in particular, a region that makes up more than half of the volume of the main body. The base region can preferably make up more than three quarters of the volume of the main body. Due to the fact that the base region consists of the thermoset, the coefficient of thermal expansion of the main body is significantly determined by the coefficient of thermal expansion of the thermoset. The coefficient of thermal expansion of the thermoplastic, on the other hand, has only a very small influence.

The thermoplastic can form a sheath for the base region. This can mean, for example, that at least one part of the base region is enclosed by the sheath. Thus, for example, an outer side of the main body can consist of the thermoplastic and can therefore be connected to other components in a particularly simple manner.

The sheath can be connected to a further component of the pump device. For example, the further component can be welded, screwed, and/or latched to the sheath. The further component can be a housing and/or a cover, for example. Within the context of this description, the housing can also be referred to as a pump housing.

The sheath can comprise one or more weld zones. The weld zone(s) can protrude outwards in the form of a ring and can be arranged circumferentially around the sheath. In the context of this description, a weld zone is understood to mean, in particular, a zone that is designed to be at least partially welded to other components. Here, in particular, the material thickness can be increased in comparison to other regions of the sheath.

The pump device can comprise seal. The seal can be situated between the thermoplastic and the thermoset. The seal can seal, for example, a gap between the thermoplastic and the thermoset. In this way, the tightness of the main body with respect to the fluid is increased.

The seal can be formed annular.

The stator core can comprise windings of electromagnetic coils. In addition, the stator core can comprise a plurality of laminations. The windings can be arranged in slots formed by these laminations.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
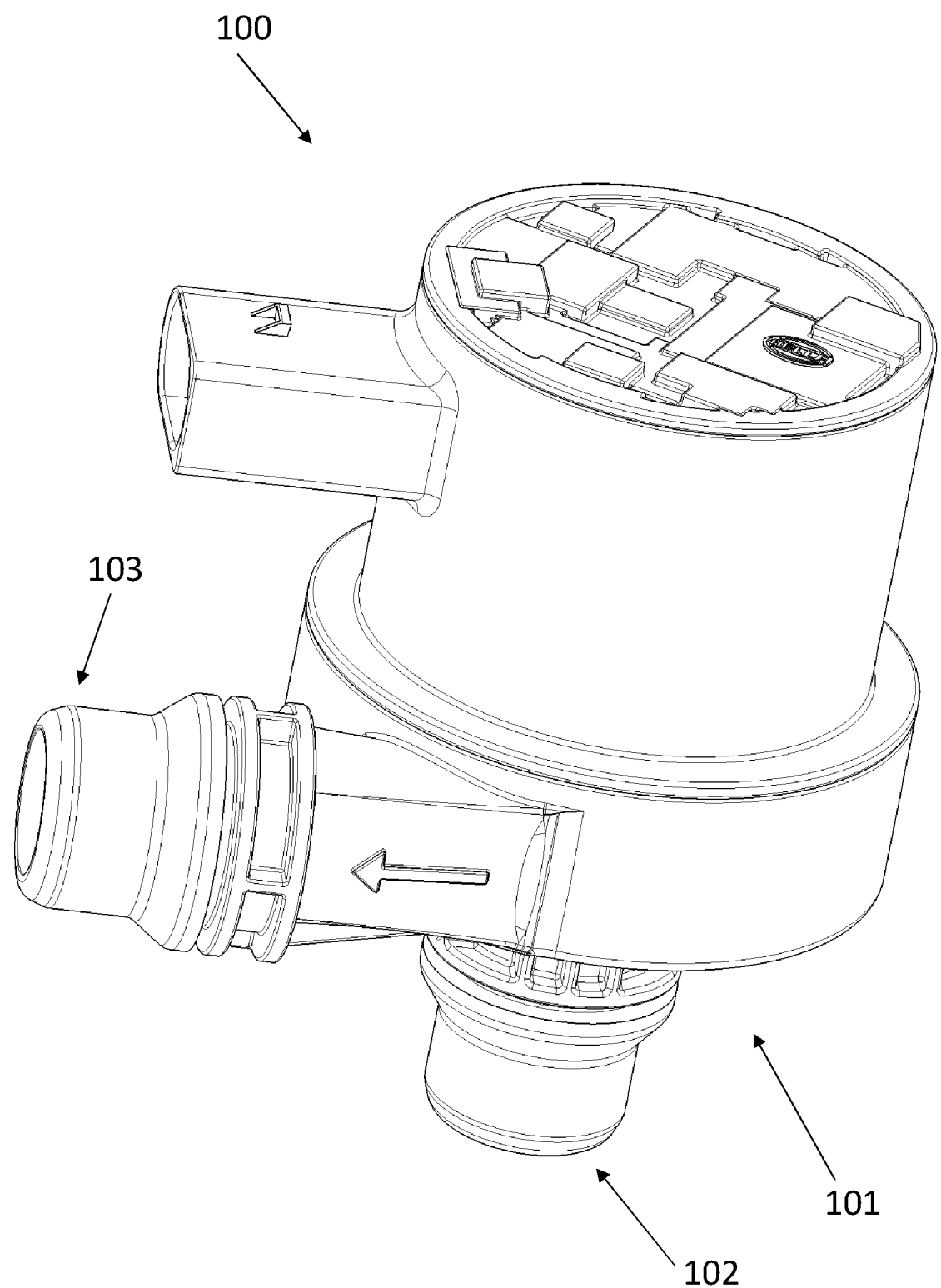
FIG. 1 shows a schematic perspective view of a pump device according to an example of the invention.
Figure 2:
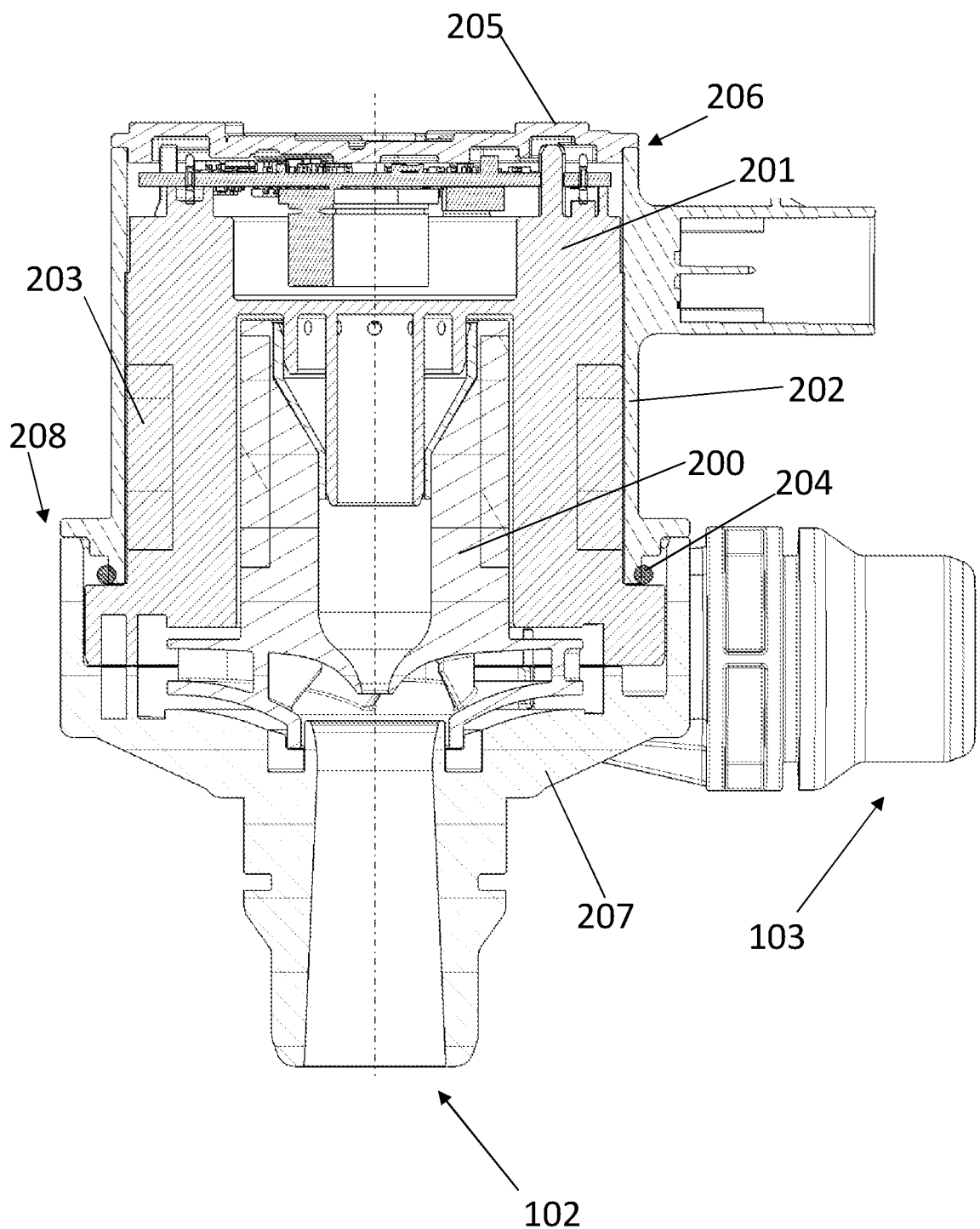
FIG. 2 shows a schematic sectional view of the pump device from FIG. 1.

Pump device 100 comprises a housing 101, an inlet 102, and an outlet 103. Pump device 100 is designed to be connected to a fluid circuit with inlet 102 and outlet 103. In operation, pump device 100 causes a flow of the fluid in the fluid circuit.

For this purpose, a rotor 200 is disposed within pump device 100, which rotates relative to a stator during operation. The stator comprises an inner region 201 and an outer region 202. Inner region 201 faces rotor 200 whereas outer region 202 is directed away from rotor 200. Inner region 201 consists of a thermoset, whereas outer region 202 consists of a thermoplastic. In addition, the stator comprises a stator core 203 with a plurality of windings of an electromagnetic coil used to drive rotor 200.

Stator core 203 is embedded in the thermoset of inner region 201. The thermoset has a similar coefficient of thermal expansion as stator core 203. When stator core 203 heats up during operation, the thermoset therefore expands in a manner similar to stator core 203, so that the risk of cracks or damage is reduced.

The thermoplastic in outer region 202 is more suitable than the thermoset for connecting to other components. Outer region 202 is welded to a cover 205 in region 206, for example. The weld zone hereby runs in a ring shape within outer region 202. In addition, outer region 202 is welded to a housing 207 in region 208. Here, outer region 202 has a circumferential rim.

A seal 204 is situated between inner region 201 and outer region 202, said seal that prevents the fluid from entering a gap between the thermoset and the thermoplastic. In this way, stator core 203 is reliably shielded from the fluid.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pump for a fluid circuit in a motor vehicle, the pump comprising:
   a stator that has a stator core and a main body; and
   a rotor adapted to be set in rotation relative to the stator, wherein the stator core is enclosed by the main body in a fluid-tight manner,
   wherein the main body comprises a thermoset and a thermoplastic,
   wherein the stator core is embedded in the thermoset,
   wherein an inner region of the main body comprises the thermoset, the inner region forming a base region of the main body, and
   wherein an outer region of the main body comprises the thermoplastic, the outer region forming a sheath for the base region, the sheath being discrete from the base region, the pump further comprising a front housing cover having an inlet, and a rear housing cover, wherein the front housing cover is welded to the sheath at a first weld zone, and the rear housing cover is welded to the sheath at a second weld zone.

2. The pump according to claim 1, wherein the sheath is connected to a further component of the pump.

3. The pump according to claim 1, wherein the pump comprises a seal, wherein the seal is arranged between the thermoplastic and the thermoset.

4. The pump according to claim 3, wherein the seal is formed annular.

5. The pump according to claim 1, wherein the stator core comprises windings of electromagnetic coils.

6. A motor vehicle, comprising:
   the fluid circuit and the pump according to claim 1, wherein the pump is designed to pump a fluid through the fluid circuit.

7. The pump according to claim 1, wherein the front housing cover is attached to a first end of the sheath, and the rear housing cover is attached to a second end of the sheath that opposes the first end.

* * * * *